(12) United States Patent
Lucht et al.

(10) Patent No.: US 8,951,119 B2
(45) Date of Patent: Feb. 10, 2015

(54) INPUT DEVICE AND METHOD FOR PROVIDING AN OUTPUT SIGNAL ASSOCIATED WITH A SENSOR FIELD OCCUPANCY

(75) Inventors: Martina Lucht, Erfurt (DE); Swen Gaudl, Tuettleben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 364 days.

(21) Appl. No.: 13/216,887

(22) Filed: Aug. 24, 2011

(65) Prior Publication Data
US 2012/0046103 A1 Feb. 23, 2012

Related U.S. Application Data (63) Continuation of application No. PCT/EP2010/051873, filed on Feb. 15, 2010.

(30) Foreign Application Priority Data

Feb. 24, 2009 (DE) .......................... 10 2009 010 277

(51) Int. Cl.
| | |
|---|---|
| A63F 13/214 | (2014.01) |
| A63F 13/52 | (2014.01) |
| G09B 7/00 | (2006.01) |
| A63F 13/20 | (2014.01) |
| G06F 3/01 | (2006.01) |
| G06F 3/02 | (2006.01) |
| A63F 9/00 | (2006.01) |
| A63F 11/00 | (2006.01) |

(52) U.S. Cl.
CPC . *G09B 7/00* (2013.01); *A63F 13/06* (2013.01); *G06F 3/01* (2013.01); *G06F 3/011* (2013.01); *G06F 3/0219* (2013.01); *A63F 9/0098* (2013.01); *A63F 2011/0081* (2013.01); *A63F 2300/1068* (2013.01); *A63F 2300/305* (2013.01)
USPC ........................................................... 463/36

(58) Field of Classification Search
USPC .......................................................... 463/36
See application file for complete search history.

(56) References Cited

U.S. PATENT DOCUMENTS

| | | | |
|---|---|---|---|
| 6,450,888 B1 | 9/2002 | Takase et al. | |
| 6,669,562 B1 * | 12/2003 | Shiino | ............................. 463/31 |
| 7,301,481 B2 * | 11/2007 | Okada et al. | ..................... 341/20 |
| 2001/0014620 A1 | 8/2001 | Nobe et al. | |
| 2002/0196163 A1 | 12/2002 | Bradford et al. | |
| 2004/0201576 A1 | 10/2004 | Shimada et al. | |
| 2006/0187089 A1 | 8/2006 | Tolonen et al. | |
| 2007/0279256 A1 * | 12/2007 | Salman et al. | ................... 341/23 |
| 2009/0221372 A1 * | 9/2009 | Casey et al. | ..................... 463/36 |

FOREIGN PATENT DOCUMENTS

| | | |
|---|---|---|
| EP | 1768363 A1 | 3/2007 |
| GB | 2450497 A | 12/2008 |

(Continued)

*Primary Examiner* — Bach Hoang
(74) *Attorney, Agent, or Firm* — Michael A. Glenn; Perkins Coie LLP (57) ABSTRACT

An input device implemented as two-dimensional sensor mat, wherein the two-dimensional sensor mat is divided into a plurality of sensor fields that can be activated by touch, wherein, in a multiple-occupancy operating mode, at least part of the sensor fields each have several different sensor field occupancies, and wherein the different sensor field occupancies of a sensor field are associated with a different number of times this sensor field is touched.

21 Claims, 5 Drawing Sheets

(56) References Cited

FOREIGN PATENT DOCUMENTS

| JP | H06-348383 | 12/1994 |
| JP | 2000-300838 | 10/2000 |
| JP | 2004-065993 | 3/2004 |

* cited by examiner

W=:Word to be sought for (in a char array)
Wl=:Length of the word to be sought for
P=:Indicates the current position in the word W
E=:Includes the pressed keys
C=:Counts how often a key has been struck
Lb=:Includes the key pressed last
B=:Includes the letter to be indicated
Te=:Number of possible occupancies of key E
Ca=:Multi-dimensional char array including the possible occupancies of the individual keys

FIGURE 4

W = : Word to be sought for (in a char array)
Wl = : Length of the word to be sought for
P = : Indicates the current position in the word W
E = : Includes the pressed keys
C = : Counts how often a key has been struck
Lb = : Includes the key pressed last
B = : Includes the letter to be indicated
Te = : Number of possible occupancies of key E
Ca = : Multi-dimensional char array including the possible occupancies of the individual keys

INPUT DEVICE AND METHOD FOR PROVIDING AN OUTPUT SIGNAL ASSOCIATED WITH A SENSOR FIELD OCCUPANCY

CROSS-REFERENCE TO RELATED APPLICATIONS

This application is a continuation of copending International Application No. PCT/EP2010/051873, filed Feb. 15, 2010, which is incorporated herein by reference in its entirety, and additionally claims priority from German Application No DE 102009010277.9, filed Feb. 24, 2009, which is incorporated herein by reference in its entirety.

BACKGROUND OF THE INVENTION

The present invention relates to an input device implemented as two-dimensional sensor mat, wherein the two-dimensional sensor mat is divided into a plurality of sensor fields. Such input devices can be used, for example, for learning purposes, for educational games, for active games, for the purpose of physical exercise, for training body awareness, the sense of balance and associational abilities.

Previous two-dimensional sensor mats have relatively limited sensor field occupancy, which heavily restricts the option of usage or the assignment of tasks in applications. Two-dimensional sensor mats are thus mainly used, for example in the entertainment industry, to imitate specific instructions, such as movements in the direction arrows formed on the sensor fields by activating the sensor fields with the legs. Thereby, the direction of the arrows that an operating person is to touch with his or her foot within a predetermined given time frame and hence to activate the same is displayed on a monitor. In previous sensor mats, the achievement of the player was limited merely to carrying out movement instructions with the legs. So far, mental performance in the sense of solving a problem in addition to the movement performance does not exist in any sensor mat and is hence not realizable with conventional applications, such that only limited application options are given.

SUMMARY

An embodiment may have an input device implemented as two-dimensional sensor mat, wherein the two-dimensional sensor mat is divided into a plurality of sensor fields that can be activated by touch, wherein, in a multiple-occupancy operating mode, at least part of the sensor fields each comprise several different sensor field occupancies, wherein the sensor fields have such a size that they can be activated by a hand or a foot of an operating person, and wherein the different sensor field occupancies of a sensor field are associated with a different number of times this sensor field is touched.

Another embodiment may have the usage of an inventive input device implemented as two-dimensional sensor mat, for interaction with an operating person, wherein the different sensor field occupancies provided on the sensor fields can be selected by an operating person corresponding to the number of times the sensor fields are touched.

According to another embodiment, a method for providing an output signal associated with a sensor field occupancy to an input device implemented as two-dimensional sensor mat, wherein the two-dimensional sensor mat is divided into a plurality of sensor fields that can be activated by touch, wherein, in a multiple-occupancy operating mode, the sensor fields each comprise different sensor field occupancies, wherein the sensor fields have such a size that they can be activated by a hand or a foot of an operating person, and wherein the different sensor field occupancies of a sensor field are associated with a different number of times this sensor field is touched, may have the steps of: determining the activated sensor field occupancy of a sensor field by evaluating the number of times this sensor field is touched by associating the sensor field occupancy with the number of times the same is touched; and providing the output signal indicating the determined sensor field occupancy.

Another embodiment may have a computer program with a program code for performing the inventive method, when the computer program runs on a computer.

Another embodiment may have an interaction unit for controlling interaction with an operating person with an input device implemented as two-dimensional sensor mat, wherein the two-dimensional sensor mat is divided into a plurality of sensor fields, the sensor fields have such a size that they can be activated by touch with a hand or a foot, wherein at least part of the sensor fields, in a multiple-occupancy operating mode, each comprise several different sensor field occupancies, and wherein the different sensor field occupancies of a sensor field are associated with a different number of times the sensor field is touched, and wherein the interaction unit is implemented to indicate interaction instructions for an operating person, such that the operating person is to activate, based on the interaction instructions, a given output signal to be expected by touching a sensor field.

Another embodiment may have an input device implemented as two-dimensional sensor mat, wherein the two-dimensional sensor mat is divided into a plurality of sensor fields that can be activated by touch, wherein, in a multiple-occupancy operating mode, at least part of the sensor fields each comprise several different sensor field occupancies, and wherein the different sensor field occupancies of a sensor field are associated with a different number of times this sensor field is touched, and wherein the input device comprises a rendering unit with an interaction unit for controlling interaction with an operating person and a comparison unit, wherein the interaction unit is implemented to output interaction instructions for the operating person, such that the operating person, based on the interaction instructions, can activate a given output signal to be expected by touching a sensor field; and wherein the comparison unit is implemented to compare an output signal activated by an operating person with an output signal to be expected given to the operating person based on the interaction instruction, in order to obtain an output signal evaluation, and wherein the comparison unit is coupled to the interaction unit.

According to the embodiments the present invention provides a method and an input device for a two-dimensional sensor mat having several sensor fields, wherein the sensor fields comprise several different sensor field occupancies in a multiple-occupancy operating mode.

According to further embodiments, the present invention provides an input device implemented as two-dimensional sensor mat, wherein the input device comprises a rendering unit that can provide an output signal in response to the activation of a sensor field of the two-dimensional sensor mat corresponding to the sensor field occupancy of the sensor field associated with the number of times the same is touched.

According to further embodiments of the present invention, the input device can comprise a rendering unit having an interaction unit for controlling interaction with an operating person, wherein the interaction unit outputs interaction instructions for the operating person, such that the operating person is to activate, based on the interaction instructions, an output signal to be expected by touching a sensor field of the two-dimensional sensor mat.

It is the finding of the present invention to associate several functions or sensor field occupancies with at least part of the sensor fields on the sensor mat in a multiple-occupancy mode. In such a multiple-occupancy mode of a two-dimensional sensor mat, several actions per sensor field can be activated, e.g. a selection of a number of letters can be made. In the multiple-occupancy operating mode, the fields on the sensor mat can represent several functions, which is why the number of functions in an operating mode is not as limited to the number of sensor mat fields. This opens up a plurality of application options. Additionally, in contrary to conventional sensor mats or applications of sensor mats with the associated software, the input device implemented as two-dimensional sensor mat can be used independent of manufacturer-specific platforms or consoles. Thereby, a customer has no additional costs for hardware and no possible limitations with regard to usage. The inventive sensor mat can run on a PC/MAC or on a specifically designed console in a platform-independent manner. From the manufacturers point of view, innovations in the form of updates and new versions are less problematic and less expensive since they do not have to be adapted to different platforms.

BRIEF DESCRIPTION OF THE DRAWINGS

Embodiments of the present invention will be detailed subsequently referring to the appended drawings, in which.

DETAILED DESCRIPTION OF THE INVENTION

In the following, with reference to accompanying FIGS. 1a to 4, embodiments of the input device implemented as two-dimensional sensor mat or the method for providing an output signal associated with sensor field occupancy will be discussed in detail.

Regarding the following description of embodiments of the present invention, it should be noted that, for simplification reasons, the same reference numerals are used for functionally identical and equally effective or functionally equal, equivalent elements in the different figures in the whole description.

Figure 1A:
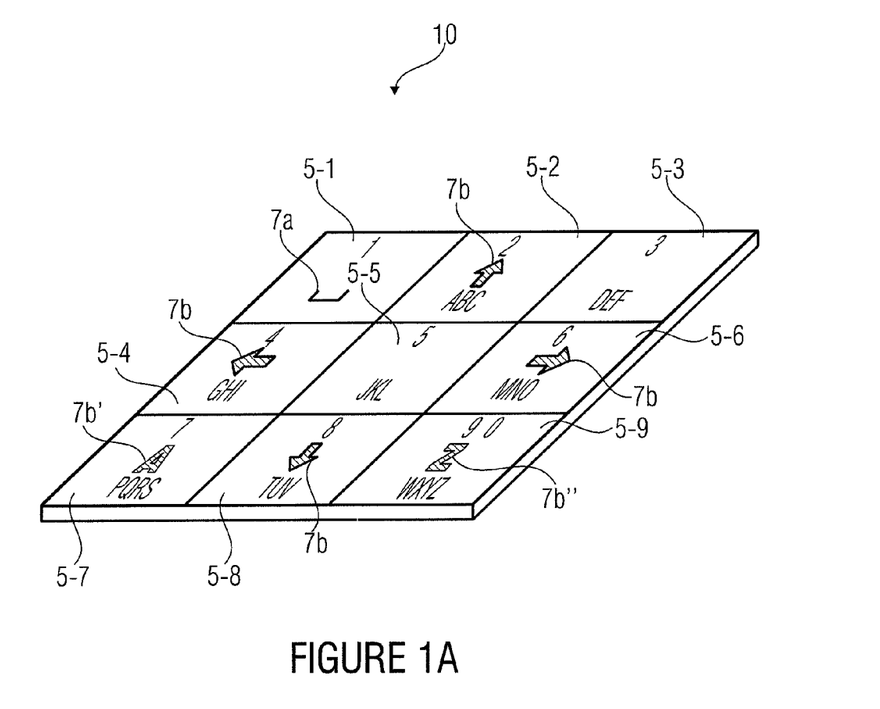
FIG. 1a is the schematic illustration of an input device implemented as a two-dimensional sensor mat, wherein the two-dimensional sensor mat according to an embodiment of the present invention comprises a plurality of sensor fields with several different sensor field occupancies.

FIG. 1a shows an input device 10 implemented as two-dimensional sensor mat, wherein the two-dimensional sensor mat is divided in a plurality of sensor fields 5-1, . . . , 5-9. These sensor fields 5-1, . . . , 5-9 can be activated by touch.

The two-dimensional sensor mat can have different sensor occupations in several operating modes. In one operating mode, the sensor field occupancy 7b, 7b', 7b" can be associated, for example with arrows and special characters A (Selection) and Z (Back). A single touch of one of these sensor fields 7b, 7b', 7b" results in the activation of this sensor field. Thus, in this operating mode, every sensor field is associated with exactly one symbol or one action that can be activated by touch.

In a first multiple-occupancy operating mode, sensor fields can be associated, for example, with numbers 0 to 9. For example, sensor field 5-1 can be associated with number 1, sensor field 5-2 with number 2, sensor field 5-3 with number 3, etc. In this embodiment, the sensor field 5-9 comprises multiple-occupancy with numbers 9 and 0. This means in a multiple-occupancy operating mode, at least part of the sensor fields—here sensor field 5-9—comprises several different sensor field occupancies—here numbers 9 and 0. Activation of the sensor field occupancy of sensor fields 5-1, . . . , 5-8 occupied "once" is again performed by touching the respective sensor fields once. Activation of number 9 on the sensor field 5-9 occupied "several times" can also be performed by touching the field once. Number 0 of the multiple-occupancy of the sensor field 5-9 can then be activated by touching the sensor field 5-9 twice. Touching the same three times can then result in activating number 9 and correspondingly touching the sensor field 5-9 four times can again result in activation number 0, etc. In this first multiple-occupancy operating mode, only one sensor field, namely sensor field 5-9 comprises multiple occupancies.

In a further multiple-occupancy operating mode, the sensor field occupancy can be associated with letters A-Z and a space character 7a. In the embodiment in FIG. 1a, for example, a space character 7a is associated with sensor field 5-1, letters "A", "B" and "C" with sensor field 5-2, letters "D", "E" and "F" with sensor field 5-3, letters "G", "H" and "I" with sensor field 5-4, letters "J", "K" and "L" with sensor field 5-5, letters "M", "N" and "O" with sensor field 5-6, letters "P", "Q", "R" and "S" with sensor field 5-7, letters "T", "U" and V with sensor field 5-8, letters "W", "X", "Y" and "Z" with sensor field 5-9. Corresponding to the above example, for example, the letter "M" can be activated by touching the sensor field 5-6 once, the letter "N" by touching twice and the letter "O" by pressing the sensor field 5-6 three times. Touching the sensor field 5-6 once more has the effect that the selection from the multiple occupancy starts again from the beginning, so that when the same is touched four times, the letter "M" is activated again, when the same is pressed five times, the letter "N", and when pressing six times, again the letter "O". It is also possible that the selection from the multiple occupancy starts again with the first sensor field selection after a predetermined timeout.

In the embodiment in FIG. 1a, the two-dimensional sensor mat 10 comprises, for example, in one operating mode an active occupancy with symbols, such as arrows 7b or special characters 7b', 7b". In another operating mode of the input device, sensor fields 5-1, . . . , 5-9 can comprise another sensor filed occupancy, such as with numbers, letters or colors. In a multiple operating mode of the input device, different sensor filed occupancies can be associated with at least one sensor field. For example, in a multiple operating mode, the sensor field 5-6 can comprise an occupancy with different letters "M", "N" and "O". Since activation of a sensor field is caused by touch, the selection of the sensor field 5-6 from the different sensor field occupancies in the multiple-occupancy operating mode can be made by how many times the same is touched and the respective selection of the letter.

Generally, at least one part of the sensor fields of the two-dimensional sensor mat in a multiple-occupancy operating mode can each comprise several different sensor field occupancies, wherein the different sensor fields occupancies of a sensor field are associated with a different number of times this sensor field is touched. The inventive implementation of the input device implemented as two-dimensional sensor mat is hence also, among others, the provision of different sensor field occupancies for at least part of the sensor fields in a multiple-occupancy operating mode to allow more complex application options.

In the embodiment in FIG. 1a the two-dimensional sensor mat 10 comprises nine two-dimensional sensor fields 5-1, . . . , 5-9 in a 3×3 matrix arrangement. Thus, an input device 10 implemented as two-dimensional sensor mat can represent a sensor matrix with a two-dimensional arrangement of sensors. Obviously, other sensor field arrangements are also possible, such as a 2×2, 4×4, 3×2 or 4×3 sensor field arrangement. Generally, in embodiments, the sensor field arrangement can correspond to an i×k matrix arrangement, wherein i=1, 2, 3, . . . n and k=2, 3, . . . m. In further embodiments of the present invention, the sensor fields can obviously also have another two-dimensional geometric shape. The same can, for example, be round, rectangular, star-shaped, trapezoidal, etc. The two-dimensional sensor mat 10 can also have another geometric shape than a rectangular shape.

Sensor fields of the input device implemented as two-dimensional sensor mat 10 are implemented such that a sensor field occupancy active on the sensor field can be activated by touching this sensor field. A sensor field occupancy can comprise, for example, letters, numbers, colors, symbols, images and icons, sounds or clefs. In other embodiments, any combination of the same can serve as sensor field occupancy. For example, multiple sensor field occupancy can also consist of letters, numbers, symbols and colors.

The sensor fields can be implemented such that they can be activated by touch. This touch can, for example, be made by feet or hands of an operating person. Correspondingly, the size of a sensor field can correspond in its dimension approximately to the size of a hand or a foot of an operating person. For example, a sensor field of the sensor mat can have a size of 20×20 cm, 30×30 cm, 30×15 cm or also 50×50 cm. A sensor field of the input device can also be implemented such that it can be activated by touching the same with a foot or a hand of an operating person and, in the multiple-occupancy operating mode, a selection of a different sensor field occupancy of this sensor field can be made by touching the same several times. The sensor fields can be implemented such that they are, for example, pressure-sensitive and thereby an electric signal is triggered or the same can also be electrically activated due to the skin conductance of an operating person.

Activating a sensor field occupancy in an operating mode can be performed by touching the same once and, in a multiple operating mode, by touching one of these fields of this sensor matrix arrangement—the input device 10—several times. Multiple occupancy of the sensor field in a multiple-occupancy operating mode results in multiplication of the input options with a two-dimensional sensor mat and hence allows the implementation of more complex application options compared to previous two-dimensional sensor mats.

The input device 10 implemented as two-dimensional sensor mat can comprise, as described above, multiple occupancy of fields 5-1, . . . , 5-9, for example with symbols, numbers, letters, special characters, etc. Thereby, that sensor field occupation is active, which is activated by an associated operating mode. The input device 10 can be in an operating mode where, for example, arrows 7b (see FIG. 1a) and special characters A (Selection) 7b' and Z (Back) 7b" are active. An operating person can perform a change of the operating mode by an input, such that, for example, a multiple-occupancy operating mode is active. Thus, the input device can comprise several operating modes. One of these operating modes can then also be the above-mentioned multiple-occupancy operating mode, where the sensor fields comprise multiple occupancy, for example with letters, as it is, for example the case for sensor field 5-6 in FIG. 1a. Active sensor field occupancy can also be displayed, for example, on a monitor or the sensor field itself, for example by optically highlighting the same in order to indicate the respectively active sensor field occupancy to an operating person.

Figure 1B:
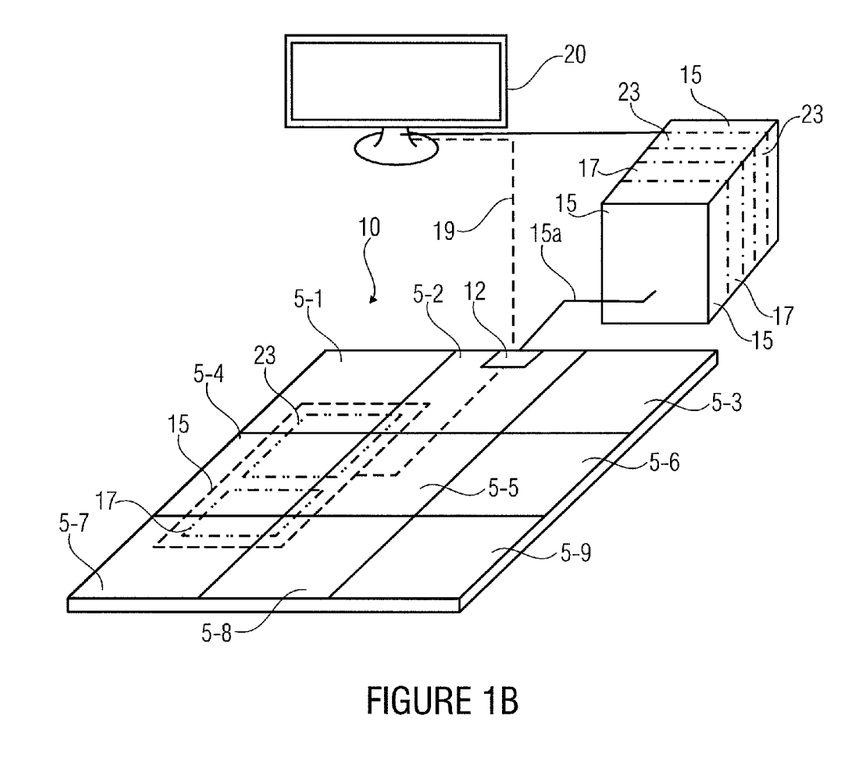
FIG. 1b is the schematic illustration of a two-dimensional sensor mat with an external rendering unit or optionally with an internal rendering unit and a reproduction unit according to an embodiment of the present invention.

FIG. 1b schematically illustrates further embodiments of the present invention. An input device 10 implemented as two-dimensional sensor mat can comprise, for example, in one embodiment a rendering unit 15, wherein this rendering unit can be implemented as software, which means as computer program or hardware, i.e. in the form of electric circuits. According to the embodiments, the rendering unit 15 can be implemented to provide an output signal indicating, in response to an activation of a sensor field 5-1, . . . , 5-9 in a multiple-occupancy operating mode, the sensor field occupancy associated with the number of times the same is touched.

The rendering unit can, as seen in FIG. 1b, for example be an externally arranged rendering unit that can be coupled to the two-dimensional sensor mat via a wired or wireless connection 15a. Additionally, the two-dimensional sensor mat can comprise an interface 12 by which the same is coupled to the external rendering unit 15. This interface can, for example, be an USB-interface (USB=Universal Serial Bus). The interface 12 can be a standardized I/O-interface (I/O=Input-Output). Thus, the inventive input device can be implemented such that the same can be used in a platform-independent manner and cannot only be used on a PC, a MAC or a specific console. A platform independent application can allow a more cost effective and universally usable input device.

Coupling between the rendering unit 15 and the two-dimensional sensor mat 10 can be wired or wireless, for example via Wireless Local Area Network (WLAN), Bluetooth, Infrared or Wireless USB. In other embodiments, the rendering unit 15 can optionally also be integrated in the two-dimensional sensor mat 10, as indicated by dashed line 15 in FIG. 1b. The rendering unit can be implemented as software or as hardware. The integrated rendering unit 15 can again be connected to an interface 12 to provide an output signal, which indicates, in response to activation of a sensor field 5-1, . . . , 5-9 in a multiple-occupancy operating mode the sensor field occupancy associated with the number of times this sensor field is touched. The output signal can be an electric output signal. In several embodiments, the rendering unit 15 is implemented to determine, in the multiple-occupancy operating mode, an activated sensor field occupancy of a sensor field by evaluating the number of times this sensor field is touched, by associating the number of times it is touched with the respective sensor field occupancy. The rendering unit that can be present, for example, as computer program, can thus also be suitable to select the letter "M" when touching the sensor field 5-6 once in the multiple-occupancy operating mode, where the letters on the sensor field are activated, and to provide a respective output signal to the interface 12. When the sensor field 5-6 is touched twice, the respective output signal for the letter "N" can be provided at the interface 12. By activating the sensor field 5-6 after evaluating the number of contacts by the rendering unit, an output signal associated with the letter "O" can be provided.

In several embodiments of the present invention, the input device 10 can comprise a reproduction unit 20 implemented to reproduce an output signal activated by the operating person. The reproduction unit can, for example, as indicated in FIG. 1b, be a television, a monitor or any other visual reproduction unit. In other embodiments of the present invention, the reproduction unit can, for example, also be loudspeaker that can reproduce, for example, acoustic signals or sounds, activated by the sensor field occupancy. Generally, the reproduction unit 20 can be implemented to reproduce output signals in a visual, acoustic or also haptic manner, for example by vibration.

In several embodiments of the present invention, an input device 10 can comprise a rendering unit 15 further comprising an interaction unit 23, wherein the interaction unit is implemented to control an interaction with an operating person of the input unit 10. The interaction unit 23 can be implemented to provide interaction instructions for an operating person of the input device, such that the operating person is to activate an output signal to be expected based on the interaction instructions by touching a sensor field of the two-dimensional sensor mat. In other words, the interaction unit 23 can give instructions to an operating person. Such an instruction can, for example, be a command, a question, a visual, acoustic or haptic signal based on which an operating person is to operate specific sensor field to generate an output signal expected on the instruction. Like the rendering unit, the interaction unit 23 can be integrated in the two-dimensional sensor mat 10 and can be part of the integrated rendering unit 15 or also part of an external console or part of an external rendering unit 15. The same can run as program code on a computer coupled to the two-dimensional sensor mat. The interaction unit can be implemented as software and as hardware. An operating person can be given interaction instructions, for example by a computer program, such that the operating person is to touch a sensor field based on the interaction instruction given by the computer program in order to activate an expected output signal. In other words, the interaction unit can set a task for an operating person, which the operating person is to solve by touching one or several specific sensor fields.

According to several embodiments, the reproduction unit 20 can serve, on the one hand, to reproduce the output signal activated by the operating person and/or also to reproduce the interaction instructions of the interaction unit 23 for the operating person. In embodiments, the reproduction unit 20 can be implemented to reproduce the output signal activated by the operating person and/or the interaction instruction for the operating person in a visual, acoustic or haptic manner. Thus, an interaction instruction can be displayed to an operating person, for example on a monitor 20. Based on this interaction instruction, the operating person is to activate one or several sensor fields in order to fulfill the interaction instruction correctly.

In other embodiments of the present invention, the input device can comprise sensor fields with reproduction units. These sensor fields with reproduction units can be implemented such that either a visual, acoustic or haptic reproduction of an output signal is enabled by touch, and/or a visual, acoustic or haptic interaction instruction for an operating person can be made by an interaction unit. In other words, in several embodiments, the input device may comprise no external reply unit, such as a monitor, television set or loudspeaker. Rather, a loudspeaker can be integrated in the sensor mat, or every sensor field can comprise a loudspeaker, which then reproduces a specific sound or sequence of sounds when activated by the operating person. In other embodiments, a sensor field of the input device can comprise a reproduction unit, for example in the form of a LED (LED=Light Emitting Diode) outputting an optical signal when the sensor field is activated.

In particular, such a sensor field can also comprise organic light emitting diodes (OLEDs) in two-dimensional shape with differently emitting colors and any two-dimensional implementation. Such OLEDs can also be produced on flexible substrates, i.e. they can be movable and flexible like a mat and thereby quite easily be integrated in an inventive sensor mat. With such organic LEDs it is, for example, possible to present specific symbols or sensor field occupancies of a sensor field in a two-dimensional luminescent manner when activated or also to optically highlight a selection that can be activated (e.g. numbers, letters or colors). It is also possible that an interaction unit gives out an interaction instruction to an operating person, for example by differently flashing sensor fields and this operating person then selects an output signal to be expected when activating respectively flashing sensor fields. In a multiple-occupancy mode of the two-dimensional sensor mat, in that way, different just activated sensor field occupancies can flash by touching a respective sensor field several times. A multiple-occupancy operating mode can be selected, for example, via a menu selection, so that after selecting the multiple-occupancy operating mode the sensor fields with their different sensor field occupancies can be activated by touch and in dependence of number of times the same are touched. The respectively active sensor field occupancy can then be displayed visually highlighted on the sensor field.

According to several embodiments of the present invention, the input device implemented as two-dimensional sensor mat 10 can comprise a rendering unit 15, further comprising a comparison unit 17. This comparison unit 17 can be implemented to compare an output signal activated by an operating person with an output signal to be expected based on the interaction instruction of an interaction unit 23 to the operating person in order to obtain an output signal evaluation. For that purpose, the comparison unit 23 can be coupled to the interaction unit. Corresponding to the interaction unit or the rendering unit, the comparison unit can be arranged externally and can be coupled to the two-dimensional sensor mat 10 or can be integrated into the same. The comparison unit 23 can again be implemented as software in the form of a computer program or part of a computer program or can be present as hardware in the form of electronic circuits. Further, the comparison unit 17 can be implemented to store the output signal evaluation and provide an output signal evaluation list (highscore) based on a plurality of stored output signal evaluations. The comparison unit can be implemented to prompt storage of the output signal evaluation or to perform the same itself.

The result of this output signal evaluation can be reproduced in a visual, acoustic or a haptic manner for an operating person by the reproduction unit 20 or by sensor fields implemented as reproduction unit. Thus, an operating person can detect whether the sensor field activated by touch and the respective output signal correspond to the output signal to be expected and given by the interaction instruction of the interaction unit or not. Thus, the operating person can check the correctness of his/her input regarding the interaction instruction given by the interaction unit by visual, acoustic or haptic reproduction.

In embodiments of the present invention, an interaction instruction can consist of a sequence, i.e. several letters, numbers, characters, sounds, colors, music, symbols or a combination of the same. An interaction instruction can comprise, for example, a word of several letters or a number of several digits, etc. An output signal to be expected due to an interaction instruction or an input of an operating person can then also consist of a sequence of letters, numbers, characters, sounds, colors, music, symbols or a combination of letters, numbers, characters, sounds, colors, music, symbols. An operating person can then activate this sequence by touching a respective sequence of sensor fields. The comparison unit 17 can now be implemented to perform an output signal evaluation for each output signal of a sequence of letters, numbers, etc. and thus to perform an output signal evaluation for the output signal sequence.

In the multiple-occupancy operating mode, a number of different output signals can be provided which exceeds the number of sensor fields. Thus, the inventive input device enables more complex application options with relatively few sensor fields. For example, as seen in FIG. 1a, by using nine sensor fields 5-1, . . . , 5-9, the representation of the whole alphabet A-Z is possible in a multiple-occupancy operating mode.

An input device implemented as two-dimensional sensor mat can be used for a number of purposes. One application can, for example, be interaction with an operating person, wherein the different sensor field occupancies provided on the sensor fields in a multiple-occupancy operating mode can be selected by the operating person corresponding to the number of times the sensor fields are touched. The different sensor field occupancy of a sensor field can for example be written or printed on the sensor field. In order to show the respective active occupancy in multiple occupancy of the sensor fields, a display with the current occupancy can be displayed on a reproduction unit, for example a monitor. Alternatively, the active sensor field occupancy of the sensor field can be illuminated or displayed in an optically highlighted manner. As already mentioned above, the sensor mat can also be designed such that the "labeling" of the sensor fields adapts itself to the respectively active field occupancy.

Due to the multidimensional field occupancy in a multiple-occupancy operating mode, the two-dimensional sensor mat 10 can realize new application options as regard to content. For example, learning tasks set for an operating person by an interaction unit can be combined with movement tasks, namely by touching respective sensor fields. Thus, the operating person does not only practice a stimulus reaction based on the interaction instruction, but, additionally, has to solve a brain-teaser based on the interaction instruction, to associate the correct field and to perform the respective movement. In fields of application, the input device can be used for practicing learning matter, body awareness, sense of balance, association of the correct field and the number of times the same is touched.

For example, the input device implemented as two-dimensional sensor mat can comprise an interaction device presenting an interaction instruction to an operating person via a reproduction unit. Such an interaction instruction could be, for example, of the following type; Search for letter "X", Search for number "5", whereupon the operating person is to operate the respective sensor field. A more complicated application option could, for example, be the translation of foreign words, wherefore an operating person is to activate a sequence of letters on the two-dimensional sensor mat. For this, it can be advantageous when the input device comprises a multiple-occupancy operating mode, which allows the allocation of several different sensor field applications to a sensor field. A comparison unit can then compare the inputs made by the operating person with the expected translated foreign word.

Further interaction instruction can, for example, be the provision of a word, e.g. "chair", which should then be jumped by the operating person on the sensor fields of the two-dimensional sensor mat. Further, for example, the sequence of numbers from 1 to 10, etc., would have to be jumped. Mathematical tasks with addition, subtraction, multiplication, division, rule of three, fractions, algebra, etc., translations, fill-in-the-blank texts, sports courses can be solved by "jumping" or touching the respective sensor fields. If, for example, a child jumps on the sensor field, the current sensor field occupation can be displayed on a PC monitor or television set, depending on the operating mode. Possible is also the realization of color or sound combinations to be jumped, i.e. jumping color patterns, songs and sequences of sound or conjugation of vocabulary, etc. The inventive input device can thus also be implemented as "dancing mat" with manifold theme-related sensor fields that are multidimensional—i.e. have several occupation options. In several embodiments of the present invention, an interaction instruction can be output to the operating person with a time allowance, such that the answer expected based on the interaction instruction has to be answered by the operating person within a specific period. For example, an interaction instruction can read as follows: "Translate the word Tisch into English", and a respective time allowance for the translation can be, for example, 20 seconds, within that the operating person has to touch the respective sensor fields for the English word "table". It is also possible to input four-digit numbers with all extremities (legs and arms) on the sensor mat simultaneously or within a predetermined time period. Other application options can be, for example, the conversion of a "color by numbers" game with the legs or a game of "pairs" with the legs, etc.

In an embodiment, the input device implemented as a two-dimensional sensor mat can, for example, be used as "dancing mat" in a learning and moving game. In this learning and moving game, the "dancing mat" includes multiple occupancy of the fields, for example with arrows, numbers, letters and special characters. Thereby, that occupancy is active that is relevant in the associated playing mode (operating mode). If a player is within a menu selection, for example, the arrows or special characters A (selection) and Z (back) (see FIG. 1a) are active. The interaction unit sets several tasks for the player, which are displayed on a monitor. The solution of these tasks is then to be "written" by the player by jumping on the respective sensor fields of the attached sensor mat. If the interaction unit sets a calculating task, the number fields are active, in tasks with language answers, the letter fields are active. The letter and number occupancy is again multidimensional—i.e. a sensor field comprises several different sensor field occupancies, is thus in a multiple-occupancy operating mode. By such an application of the inventive input device, a learning process for learning matter, which children may find boring, for example, such as learning vocabulary and conjugating, can be made more attractive by moving elements. Learning is then a no longer in the foreground but can rather be perceived by children as a side effect. This can result in a higher learning motivation.

For an operating person, it can be easier to conceive learning content by a combination of movement, coordination and thinking power, or to memorize it by specific movements—"dancing steps". The movement elements can also train coordination of movements and sense of balance of an operating person. Correspondingly, it is possible that the inventive input device is used both for children, adults and for the elderly necessitating specific movement incentives.

The inventive two-dimensional sensor mat allows manifold processing of discrete and specific characters by controlling, selecting characters, organizing and also utilizing characters based on a defined task, for example allocating colors, writing words, moving, placing, arranging or modulating things, etc. Further by validating, i.e. checking and also by acoustic, visual or haptic representation.

The input unit 10 or the rendering unit 15 can have an internal or external energy supply. This means the two-dimensional sensor mat 10 can, for example, be operated by batteries or also possibly by an adapter and can be connected to the current supply of a building or another system.

Figure 2:
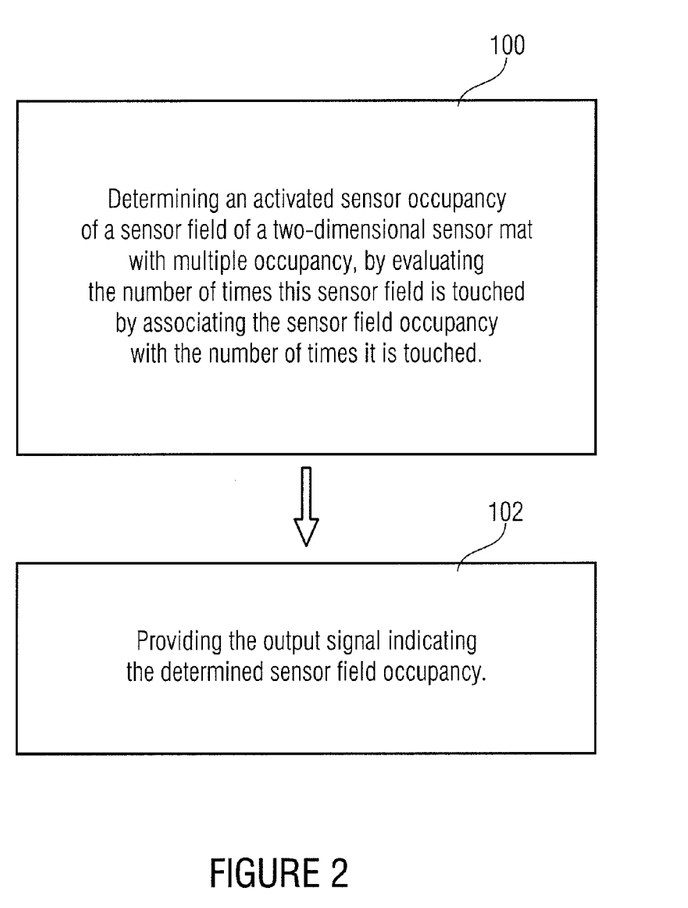
FIG. 2 shows a flow diagram of a method for providing an output signal associated with sensor field occupancy according to an embodiment of the present invention.

FIG. 2 illustrates a flow diagram of an embodiment of a method for providing an output signal associated with a sensor field occupancy. According to embodiments, the method relates to an input device implemented as two-dimensional sensor mat, wherein the two-dimensional sensor mat is divided into a plurality of sensor fields that can be activated by touch, wherein, in a multiple-occupancy operating mode, the sensor fields each comprise several different sensor field occupancies, and wherein the different sensor field occupancies of a sensor field are associated with a different number of times this sensor field is touched. According to several embodiments, the method can comprise the following steps:

Determining 100 the activated sensor field occupancy of the sensor fields by evaluating the number of times this sensor field is touched by associating the sensor field occupancy with the number of times it is touched and by a step of providing 102 of the output signal indicating the determined sensor field occupancy.

As already mentioned above, in a multiple operating mode of this two-dimensional sensor mat, a sensor field can have a different sensor field occupancy, comprising, for example, letters, numbers, digits, characters, sounds, colors, music, clefs, symbols or a combination of the just mentioned items. In embodiments of the method, in a multiple-occupancy operating mode, a specific sensor field occupancy can be selected from a number of different sensor field occupancies for a sensor field in dependence on the number of times this sensor field is touched. According to embodiments of the present invention, the method can be applied to individual characters, letters, numbers, etc. or the steps of determining 100 the activated sensor field occupancy and providing 102 the output signal can be repeated in order to indicate a sequence of output signals associated with letters, numbers, characters, digits, sounds, colors, music, clefs, symbols or any combination of the same.

Additionally, the method can comprise steps of comparing the sensor field activated by touch with the last activated (touched) sensor field, in order to decide whether, in a multiple-occupancy operating mode, a selection from several different sensor field occupancies of the respectively activated sensor field has to be made. Further, the method can comprise counting the number of times the activated sensor field is touched in order to perform a comparison of this number of times with a possible number of different sensor field occupancies of this sensor field. If the number of times the same is touched is higher than the number of possible different sensor field occupancies of the sensor field, a counter where the number of times the sensor field is touched is latched can be set again to a start or initialization value, e.g. 0. For example, by touching the sensor field 5-6 in FIG. 1a four times, the letter "M" can be activated again. The number of possible different occupancies for the sensor field 5-6 in FIG. 1a is, for example 3, namely "M", "N", and "O", for the sensor field 5-7, the number of different sensor field occupancies is, e.g. 4. Determining the activated sensor field occupancy of a sensor field by evaluating the number of times this sensor field is touched can now be performed such that, for example, a character or an output signal for this character is selected in a computer program in a list based on the activation of the specific sensor field and the number of times the specific sensor field is touched.

Figure 3:
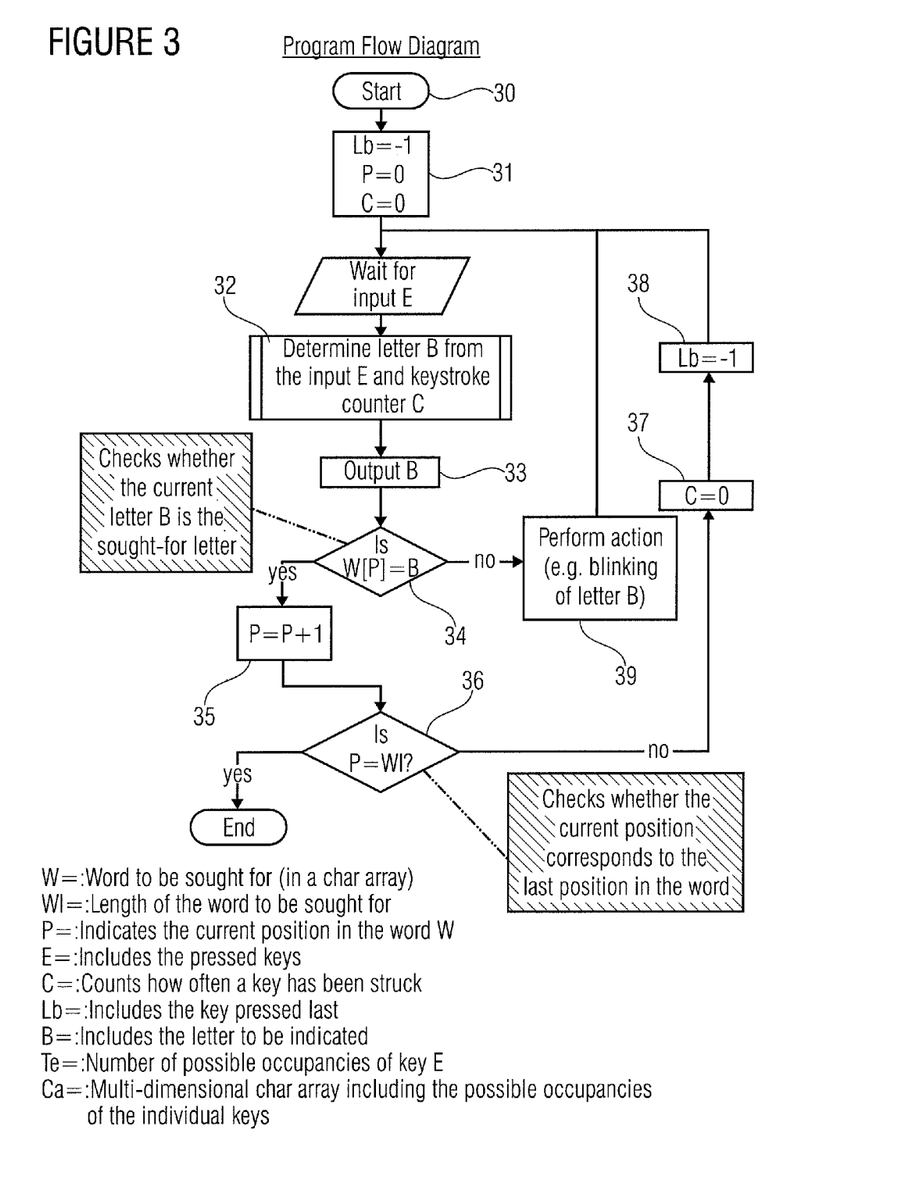
FIG. 3 is a computer program flow diagram for the method for providing an output signal associated with a sensor field occupancy according to an embodiment of the present invention.
Figure 4:
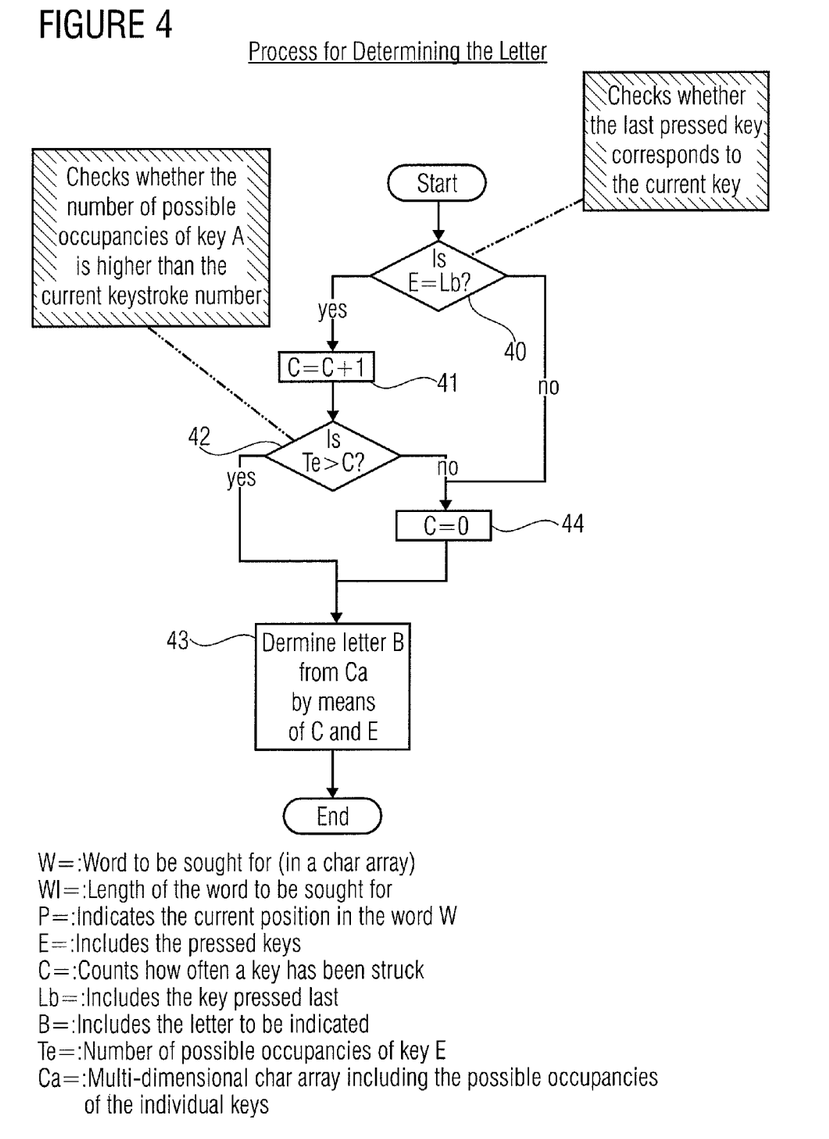
FIG. 4 is a program flow diagram for the process for determining an activated sensor field according to an embodiment of the present invention.

FIGS. 3 and 4 show a program flow diagram of an embodiment for implementing the method of providing an output signal associated with sensor field occupancy. In this embodiment, in a multiple-occupancy operating mode, a word made up of several letters, i.e. a sequence of letters, is sought for. A reproduction unit can display the letters activated by touch, for example. In the following, determining a sequence of letters in a multiple operating mode of the inventive input device is illustrated, but the same procedure for providing a sequence of output signals can obviously also be applied to numbers, characters, sounds, colors, music, symbols, etc. or a combination of the same.

A rendering unit can, for example, be implemented as computer program, wherein, as in FIG. 3, the program flow diagram of this computer program can run as follows. In the flow diagram in FIG. 3, at a starting time 30, variable Lb including information on the last pressed key, variable P indicating the current position of a letter in the sought-for word W and the variable C counting how often a key has been pressed or a sensor field activated, are reset to a start or initialization value, such that, for example, Lb=−1, P=0 and C=0. After this initialization 31 of variables Lb, P and C, an input E, i.e. touch of a sensor field is waited for. After activation of a sensor field in a multiple-occupancy operating mode, the activated letter B is determined from input E and keystroke counter C in a step 32. The program flow diagram for determining the letter will be explained in more detail in context with FIG. 4. After determining the letter B, B is output or provided 33, and in a subsequent step of comparing 34 it is checked whether the currently activated letter B corresponds to the sought-for letter in the word W. Thus, it is checked, whether the letter in the sought-for word W at the respective position P indicating the current position in word W corresponds to the output letter B. Then, according to the method, if they correspond to each other, the position counter P in the word W can be increased by 1, and in a further comparison step 36 it can be checked whether the current position in the word W corresponds to the last position in the sought-for word. If this is the case, the sought-for word is found and the input is terminated. If, however, the current position in the word W does not correspond to the last position in the sought-for word, the key stroke counter C will be reset to its start or initialization value C=0 in a step 37. The same applies for variable Lb, which is then reset to its start value, for example −1 in a step 38. Subsequently, input E is waited for again and the letter B is determined from the input E of the keystroke counter C according to step 32. This is repeated until the whole sought-for word has been correctly determined by activating the respective sensor fields of the input device. If a determined letter 33 does not correspond to the letter at the respective position of the sought-for word W, in a step 34, for example, action 39 is performed indicating to an operating person that the input or activation of a sensor field does not correspond to the expected output signal. This means the operating person can possibly repeat this input or, the same can be stored, for example, as an error in an output signal evaluation list by a comparison unit for output signal evaluation.

In the following, based on the program flow diagram, the step of determining 32 the letter B from input E and the value of keystroke counter C will be described in more detail. As illustrated in FIG. 4, a comparison is performed in step 40 whether the currently activated sensor field or the currently pressed key E corresponds to the last pressed key Lb or not. Depending on this comparison, this means that in a multiple-occupancy operating mode a different sensor field occupancy of an activated sensor field is associated due to the different number of times this sensor field is touched or activated. Correspondingly, as illustrated in the program flow diagram in FIG. 4, if the currently pressed key E corresponds to the last pressed key Lb, the keystroke counter C increases by 1 in a step 41. Hence, C=C+1 applies. In this embodiment of the method for providing an output signal associated with a sensor field occupation, in a further step 42, it is checked whether the number of possible occupancies of key E or the sensor field is higher than the current key stroke number C. If the number of possible occupancies of key E is higher, the letter B, which will then be output in a step 33 (see FIG. 3), is determined in the computer program by means of C and E from a multidimensional "character" field (Char-Array) comprising all possible occupancies of the individual keys. If the number of times C a key or sensor field is touched is higher than the number of possible occupancies of key E or the different sensor field occupancies, then, after the step of comparing 42, the key stroke counter C is reset to its start value C=0, and in a step 43, the letter B to be output is determined from the multidimensional Char-Array Ca by means of values for C and E. Subsequently, the determined letter B is output again. In other words, as already described in the context of field occupancy 5-6 in FIG. 1a, the first occupancy option, namely the letter "M" is activated again, for example when pressing four times in the multiple-occupancy operating mode.

In a step of comparing 40, if the last pressed key does not correspond to the currently pressed key E, the key stroke counter C is set to C=0 in step 44, since in this case a different sensor field or a different key has been activated and correspondingly a sensor field occupancy different from this current key is activated.

Hence, according to the embodiment the inventive method can be a test method where comparison of task and activated characters is performed and a "feedback" corresponding to the instructions is output.

Embodiments of the present invention show an input device implemented as two-dimensional sensor mat, wherein the sensor mat can comprise sensor fields with multiple occupancies and different subject-related sensor field occupancies. These sensor field occupancies can be multidimensional, i.e. in one operating mode, for example, numbers can be active, in another operating mode, for example, letters can be activated and in a multiple operating mode, by means of one sensor field, different sensor field occupancies can be activated, which means one sensor field can have several selection options, such as "A", "B" and "C". This input device can comprise applications implemented by means of hardware or software, which means a computer program, allowing complex application options due to the multidimensional field occupancy, such as inputting words, solving mathematical problems, etc. The combination of movement, coordination and learning can result in an improved memory performance in applications of this input device for easier learning or improved body awareness and for stimulation of physical activities. Additionally, for example the sequence of steps connected to a solution of an interaction instruction, can serve as memory aid for remembering, for example, vocabulary, in the sense of an applied memno technology.

In embodiments of the present invention, controlling the input device can be performed by selecting, for example activating characters by touching one or several sensor fields of the sensor matrix once or several times. Motivation for learning can take place, on the one hand, due to the compulsion to move, on the other hand, for example, by a highscore of the output signal evaluation list. The highscore can also include a time accuracy of the answers. In parallel to the learning process, also, coordination of movement and sense of balance can be practiced in applications. In other application options, for example for the elderly, their knowledge can motivate them to move, for example by performing specific movements for activating the respective sensor fields in response to an interaction instruction based on their knowledge.

As already illustrated above, it should particularly be noted that depending on the circumstances the method could also be implemented as software. The implementation can be made on a digital memory medium, in particular a disc, a CD or DVD with electronically readable control signals that can cooperate with a programmable computer system such that the respective method is performed. Thus, generally, the invention consists also of a computer program product with a program code for performing the method when the computer program product runs on a computer or a respective processor stored on a machine-readable carrier. In other words, the invention can be realized as computer program with a program code for performing the method when the computer program product runs on a computer or a console, such as the rendering unit. It should be noted, that the inventive input device could also be used for medical purposes, such as for examining the ability to concentrate, motor abilities or responsiveness of an operating person or a patient or for therapeutic treatment of patients with regard to these abilities. The application as input device for people with physical disabilities, invalids, as therapy device for the elderly within a motion therapy or as memory trainer is also possible.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for controlling operation of an input device upon an activation of a sensor field, wherein the input device is implemented as a two-dimensional sensor mat, wherein the two-dimensional sensor mat is divided into a plurality of sensor fields activated by touch, wherein, the input device operates in a multiple-occupancy mode where the plurality of sensor fields each comprise different sensor field occupancies, wherein the plurality sensor fields are activated by a hand or a foot of an operating person, and wherein the different sensor field occupancies of a sensor field are associated with a different number of times the sensor field is touched, the method comprising:

determining an activated sensor field occupancy of the sensor field by evaluating a number of times the sensor field is touched by associating the activated sensor field occupancy with the number of times the same sensor field is touched;

providing an occupancy signal indicating the determined activated sensor field occupancy; and comparing an output signal, comprising a letter, currently activated by the operating person with an output signal to be expected in a sought-for sequence of output signals, where a non-corresponding output signal is indicated as incorrect; and enabling activation of a following output signal to be next expected in the sought-for sequence of output signals, only if the step of comparing provides a correspondence of the output signal currently activated by the operating person with the given output signal to be expected in the sought-for sequence of output signals.

2. The method according to claim 1, wherein the different sensor field occupancies comprises letters, numbers, characters, sounds, colors, music, symbols or a combination of letters, numbers, characters, sounds, colors, music, symbols.

3. The method according to claim 1, wherein the steps of determining the activated sensor field occupancy and providing the occupancy signal are repeated to indicate a sequence of output signals associated with a sequence of letters, numbers, characters, sounds, colors, music, symbols or a combination of letters, numbers, characters, sounds, colors, music, symbols.

4. The method according to claim 1, wherein the step of determining of the activated sensor field occupancy of a sensor field further comprises:

resetting a variable, a position counter and a key stroke counter to a respective initialization value of the variable, the position counter and the key stroke counter, wherein the variable comprises information on a last pressed sensor field, wherein the position counter serves for determining a current position in the sought-for sequence of output signals, and wherein the key stroke counter counts how often the sensor field has been activated;

waiting for the activation of the sensor field by the operating person; and determining the activated sensor field occupancy with the help of the activation of the sensor field by the operating person and the key stroke counter.

5. The method according to claim 4, further comprising:

when in the step of the enabling activation of a following output signal:

increasing a value of the position counter, and comparing whether the value of the position counter corresponds to the length of the sought-for sequence of output signals.

6. The method according to claim 5, wherein the sought-for sequence of output signals is found if the position counter corresponds to a last position in the sought-for sequence of output signals, or resetting the key stroke counter and the variable to the respective initialization value of the key stroke counter and the variable, when the position counter does not correspond to the last position in the sought-for sequence of output signals, and again waiting for another activation of the sensor field by the operating person; or if in the step of comparing no correspondence of the output signal currently activated of the activated determined sensor field occupancy with the output signal currently activated to be expected is given: performing an action indicating to the operating person that no correspondence of the output signal currently activated of the activated determined sensor field occupancy with the output signal to be expected is given.

7. The method according to claim 4, wherein the step of determining the activated sensor field occupancy with the help of the activation of the sensor field by the operating person and the key stroke counter comprises:

comparing whether the sensor field activated by the operating person and the variable correspond; and when the activated sensor field activated by the operating person and the variable correspond:

increase the keystroke counter;

check whether a number of several different sensor field occupancies of the activated sensor field is higher than the key stroke counter; and when the number of several different sensor field occupancies of the activated sensor field is higher than the keystroke counter:

determining the sensor field occupancy from a character memory field with the help of the key stroke counter and the activated sensor field; or when the number of several different sensor field occupancies of the activated sensor field is smaller than the keystroke counter:

resetting the key stroke counter to the initialization value of the key stroke counter; and determining the sensor field occupancy from the character memory field with the help of the key stroke counter and the activated sensor field; or when the sensor field activated by the operating person and the variable do not correspond:

resetting the key stroke counter to the initialization value of the key stroke counter; and determining the sensor field occupancy from the character memory field with the help of the keystroke counter and the activated sensor field.

8. A non-transitory computer-readable storage medium having stored thereon a computer program for performing, when running on a computer, a method for controlling the operation of an input device upon an activation of a sensor field, wherein the input device is implemented as a two-dimensional sensor mat, wherein the two-dimensional sensor mat is divided into a plurality of sensor fields that are activated by touch, wherein, the input device operates in a multiple-occupancy mode where the plurality of sensor fields each comprise different sensor field occupancies, wherein the plurality of sensor fields are activated by a hand or a foot of an operating person, and wherein the different sensor field occupancies of a sensor field are associated with a different number of times the sensor field is touched, the method comprising:

determining an activated sensor field occupancy of the sensor field by evaluating a number of times the sensor field is touched by associating the activated sensor field occupancy with the number of times the same sensor field is touched;

providing an occupancy signal indicating the determined activated sensor field occupancy;

comparing an output signal, comprising a letter, currently activated by the operating person with an output signal to be expected in a sought-for sequence of output signals, where a non-corresponding output signal is indicated as incorrect; and enabling the activation of a following output signal to be next expected in the sought-for sequence of output signals, only if the step of comparing provides a correspondence of the output signal currently activated by the operating person with the given output signal to be expected in the sought-for sequence of output signals.

9. An input device implemented as a two-dimensional sensor mat, wherein the two-dimensional sensor mat is divided into a plurality of sensor fields that are activated by touch, wherein the input device operates in a multiple-occupancy mode where at least part of the plurality of sensor fields each comprise several different sensor field occupancies, and wherein the different sensor field occupancies of a sensor field are associated with a different number of times the sensor field is touched, and     wherein the input device comprises a rendering unit with an interaction unit for controlling interaction with an operating person and a comparison unit, wherein the comparison unit is coupled to the interaction unit,     wherein the interaction unit is implemented to output interaction instructions for the operating person, such that the operating person, based on the interaction instructions, can activate a given output signal to be expected in a sought-for sequence of output signals by touching the sensor field;

wherein the comparison unit is implemented to compare an output signal, comprising a letter, currently activated by the operating person with the given output signal to be expected in the sought-for sequence of output signals, where a non-corresponding output signal is indicated as incorrect, and     wherein the rendering unit is implemented to enable an activation of a following output signal to be next expected in the sought-for sequence of output signals, only if the step of comparing provides a correspondence of the output signal currently activated by the operating person with the given output signal to be expected in the sought-for sequence of output signals.

10. The input device according to claim 9, wherein the two-dimensional sensor mat is bendable and flexible.

11. The input device according to claim 9, wherein the rendering unit is implemented to provide a display output signal outputting, in response to the activation of the sensor field, the sensor field occupancy associated with a number of times the same sensor field is touched.

12. The input device according to claim 11, wherein the rendering unit is implemented to determine, in the multiple-occupancy operating mode, the activation of the sensor field occupancy by evaluating a number of times the sensor field is touched, by associating the number of times the same sensor field is touched with the sensor field occupancy, and to provide the display output signal indicating a determined sensor field occupancy.

13. The input device according to claim 9, further comprising a reproduction unit for reproducing the interaction instructions for the operating person.

14. The input device according to claim 13, wherein the reproduction unit is implemented to reproduce the interaction instruction for the operating person in a visual, acoustic or haptic manner.

15. The input device according to claim 13, wherein the plurality of sensor fields comprise reproduction units allowing a visual, acoustic or haptic reproduction of the output signal or the interaction instruction by touch.

16. The input device according to claim 9, wherein the interaction unit is implemented to set a task to the operating person as the interaction instruction, such that the operating person can activate, based on the task, a solution output signal of a solution of the task by touching one or several specific sensor fields.

17. The input device according to claim 16, wherein a reproduction unit is implemented to indicate, based on the output signal currently activated comparison of the comparison unit, whether the output signal currently activated by the operating person corresponds to the solution of the task of the interaction unit or not, such that the operating person can see a correctness of the output signal currently activated in response to the task given by the interaction unit.

18. The input device according to claim 9, wherein the comparison unit is implemented to store the output signal currently activated comparison and to provide an output signal evaluation list based on a plurality of stored output signal evaluations.

19. The input device according to claim 11, further comprising an interface for externally providing the output signal currently activated.

20. The input device according to claim 9, wherein the input device comprises a plurality of different operating modes that are selectively activated by an input of the operating person, wherein the multiple-occupancy operating mode is one of the plurality of operating modes.

21. The input device according to claim 9, wherein the input device is implemented to display the sensor field occupancy of the multiple-occupancy operating mode on the sensor fields themselves.

\* \* \* \* \*